US012683288B2

(12) United States Patent
Taylor

(10) Patent No.: US 12,683,288 B2
(45) Date of Patent: Jul. 14, 2026

(54) INTEGRATED HIGH FREQUENCY HORN AND RIDGE POLARIZER

(71) Applicant: Hughes Network Systems, LLC, Germantown, MD (US)

(72) Inventor: Graham Taylor, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 16 days.

(21) Appl. No.: 18/493,003

(22) Filed: Oct. 24, 2023

(65) Prior Publication Data

US 2025/0132502 A1 Apr. 24, 2025

(51) Int. Cl.

| | |
|---|---|
| ***H01Q 13/02*** | (2006.01) |
| ***H01Q 1/28*** | (2006.01) |
| ***H01Q 5/20*** | (2015.01) |
| ***H01Q 15/24*** | (2006.01) |

(52) U.S. Cl.

CPC ........... *H01Q 15/242* (2013.01); *H01Q 1/288* (2013.01); *H01Q 5/20* (2015.01); *H01Q 13/02* (2013.01)

(58) Field of Classification Search

CPC ............... H01Q 13/02; H01Q 13/0208; H01Q 13/0258; H01Q 15/24; H01Q 15/242; H01Q 15/244; H01Q 15/246

See application file for complete search history.

(56) References Cited

U.S. PATENT DOCUMENTS

| | | | | |
|---|---|---|---|---|
| 9,742,069 | B1 * | 8/2017 | Hollenbeck | H01Q 13/0208 |
| 2010/0194655 | A1 | 8/2010 | Cook | |
| 2011/0057849 | A1 | 3/2011 | Naym et al. | |
| 2011/0133863 | A1 | 6/2011 | Lange | |
| 2021/0305707 | A1 * | 9/2021 | Gimersky | H01Q 13/0208 |
| 2024/0243481 | A1 * | 7/2024 | Hu | H01Q 13/0266 |

FOREIGN PATENT DOCUMENTS

CN 113725615 A * 11/2021

OTHER PUBLICATIONS

International Search Report for PCT Application No. PCT/US2024/052323.

* cited by examiner

*Primary Examiner* — Daniel Munoz
(74) *Attorney, Agent, or Firm* — Capitol City TechLaw; Jasbir Singh

(57) ABSTRACT

An unitary one-piece construction feed for a high frequency band antenna, the feed including: a feed horn; and a polarizer comprising a void and multiple sets of ridges disposed in the void, wherein the polarizer is in direct contact with the feed horn and the unitary one-piece construction feed is capable of operating with a carrier signal ranging across one or two consecutive bands selected from Ku, K, Ka and Q bands, for example, from 17.3 GHz to 31 GHz.

16 Claims, 3 Drawing Sheets

INTEGRATED HIGH FREQUENCY HORN AND RIDGE POLARIZER

FIELD

An integrated feed for a high frequency band antenna includes a feed horn and a polarizer in direct contact with the feed horn, preferably as a unitary one-piece construction is disclosed. The polarizer includes a void and multiple sets of ridges disposed in the void. The unitary one-piece construction feed can operate with a carrier signal ranging across one or two consecutive bands selected from Ku, K, Ka and Q bands, for example, ranging from 17.3 GHz to 31 GHz.

BACKGROUND

The high frequency band is a portion of the electromagnetic spectrum in the microwave range of frequencies. The high frequency band is used for various applications, including satellite communication.

Prior art horns and polarizers for the high frequency band are formed separately and then combined in a separate manufacturing step. The feed horn is responsible for directing the radio waves to the antenna, while the polarizer is used to convert the linearly polarized waves into circularly polarized waves or vice versa. These separate components are typically assembled together to form the antenna feed.

In some uses, high frequency antenna feeds for satellite ground terminals include of three separately die-cast pieces, namely, a divider, and a horn. This creates an opportunity for leakage of air, water and RF power in the prior art feeds. The separate components can lead to signal loss, reducing the overall efficiency of the antenna. Furthermore, the separate components can also result in a larger and heavier antenna feed, which can be a disadvantage in applications where space and weight are critical factors, such as in satellite communication systems.

Prior art polarizers use only one set of ridges, rather than multiple sets of ridges as disclosed.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Horns form the interface of satellite ground terminals with the radiating environment in the high frequency band. Polarizers are included in satellite terminals to convert from linearly polarized signals to circularly polarized signals, or vice versa. These devices are placed outdoors and a seam between a separately formed horn and polarizer is a failure point subject to damage at least from precipitation. A unitary one-piece construction horn and polarizer reduces points of failure and manufacturing costs.

In one embodiment, a unitary one-piece construction feed includes a feed horn and a polarizer in direct contact with the feed horn. The polarizer includes a void and multiple sets of ridges disposed in the void. The unitary one-piece construction feed is capable of operating with a carrier signal ranging from 12.4 GHz to 75 GHz.

Without limitation, one set of ridges of the multiple sets of ridges creates a propagating mode from what would otherwise be evanescent, non-propagating or "cut off" for a given guide size. In some embodiments, the multiple sets of ridges include two sets of ridges. For the two sets of ridges, one set of ridges is for phase shifting, and the other set is to avoid cut-off of the fundamental mode.

In another embodiment, the unitary one-piece construction feed may include a maximum height of one of the multiple sets of ridges that is lower than a maximum height of other of the multiple sets of ridges. Each set of ridges of the multiple sets of ridges may comprise two ridges, and each ridge of the multiple sets of ridges may comprise steps.

Additionally or alternatively, the unitary one-piece construction feed may include a gap in the polarizer void between the feed horn and ends of the multiple sets of ridges. The feed horn and the polarizer may be integrally formed as a unibody, which may be diecast in some embodiments.

In yet another embodiment, the void of the unitary one-piece construction feed may comprise a port to connect with an Ortho-Mode Transducer (OMT) port.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 3A:
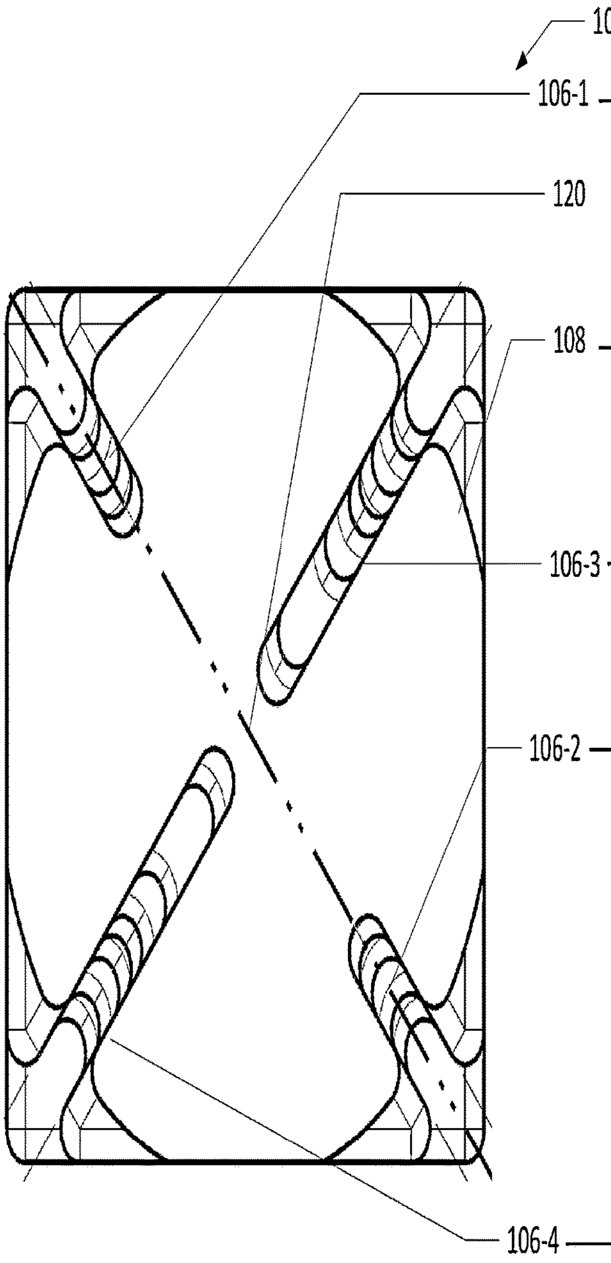

FIG. 3A illustrates a planar view from OMT port 112 of polarizer 104 for unitary one-piece construction feed 100 according to various embodiments.

Figure 3B:
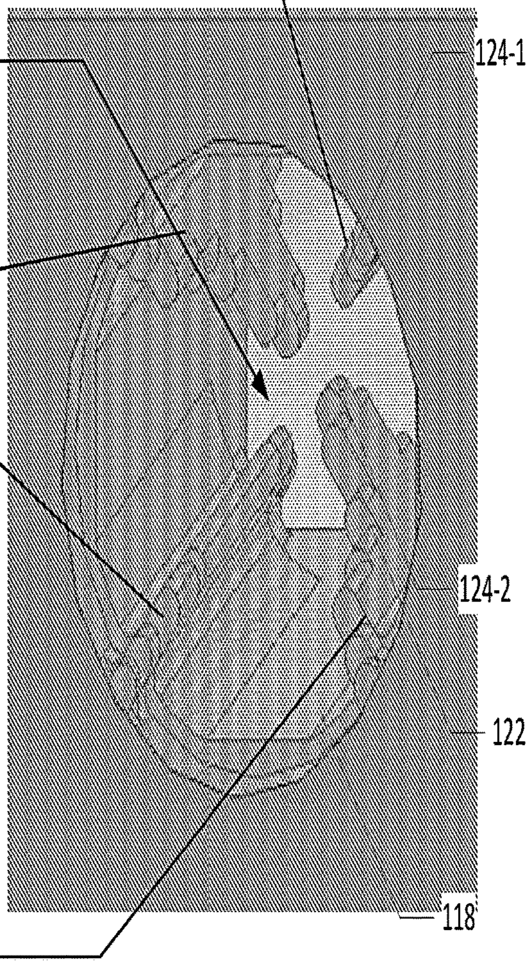

FIG. 3B illustrates a perspective view from OMT port 112 of polarizer 104 for unitary one-piece construction feed 100 according to various embodiments.

Figure 4A:
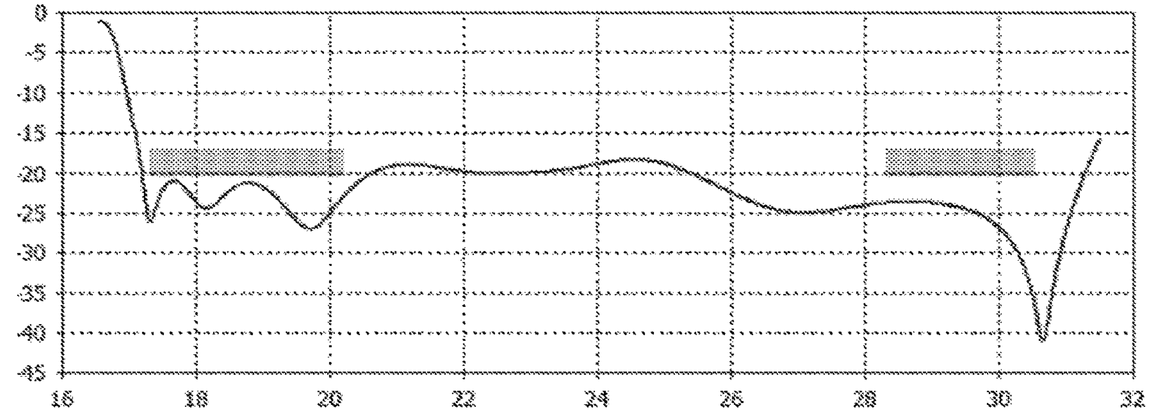

FIG. 4A illustrates a return loss of a unitary one-piece construction feed in decibels for a signal ranging from about 17 GHz to 32 GHz.

Figure 4B:
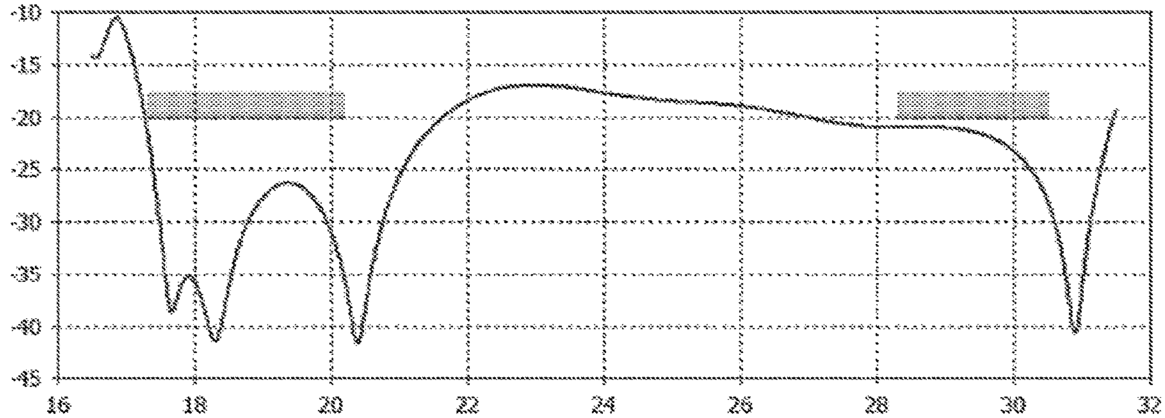

FIG. 4B illustrates a return loss of a unitary one-piece construction feed in decibels for a signal ranging from about 17 GHz to 32 GHz.

Figure 4C:
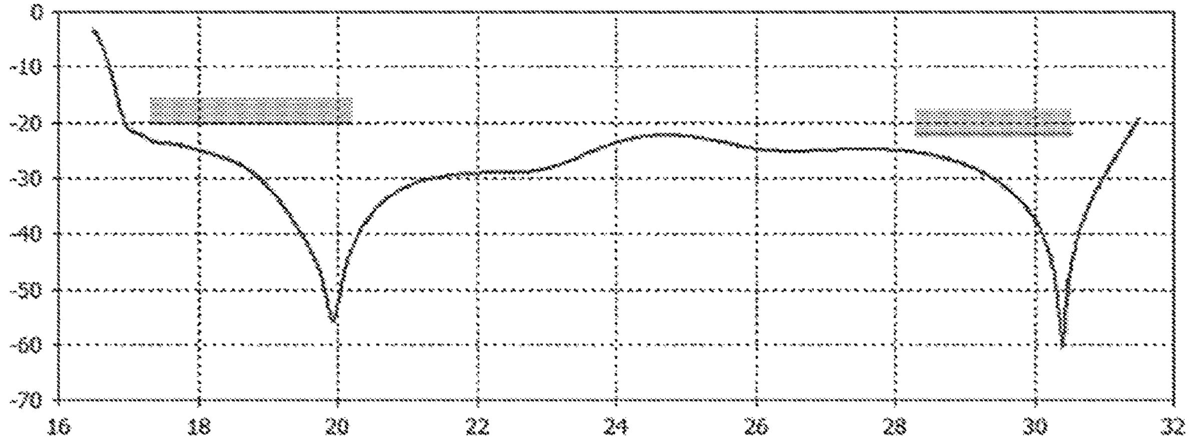

FIG. 4C illustrates a cross-polar discrimination of a unitary one-piece construction feed in decibels for a signal ranging from about 17 GHz to 32 GHz.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

As a single integral part, the feed of the present teachings is not assembled, either by means of screws or Integrated Metal Assembly (IMA). The present teachings die-cast a horn and polarizer for the high frequency band in one piece with a single metal shot. As a single integral part, the new feed eliminates a labor of assembly for the feed, either by means of screws or Integrated Metal Assembly (IMA) or the like. Since this device is one piece, there is less variation in manufacturing. Once qualified, every piece manufactured per the present teachings need not be tested; testing of the new pieces may be on a sample basis. Altogether, the elimination of assembly and testing of every feed may cut the cost of the current feed-polarizer assembly by 50%.

In some embodiments, the present feed operates in the high frequency band. The radio spectrum (also known as radio frequency or RF) is a part of the electromagnetic spectrum. Some colloquial names for RF bands are:

| Band | Frequency range |
|---|---|
| Ku band | 10.7 to 14.5 GHz |
| K band | 17.3 to 21.2 GHz |
| Ka band | 27.5 to 31.0 GHz |
| Q band | 37.5 to 42.5 GHz |
| V band | 47.2 to 52.2 GHz |

Figure 1:
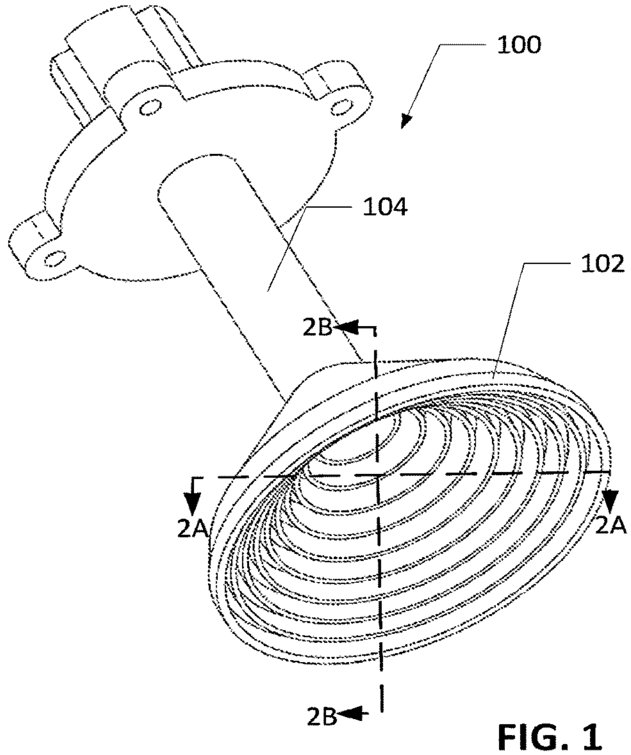
FIG. 1 illustrates a unitary one-piece construction feed for a high frequency band antenna according to various embodiments.

FIG. 1 illustrates a unitary one-piece construction feed for a high frequency band antenna according to various embodiments.

Figure 2C:
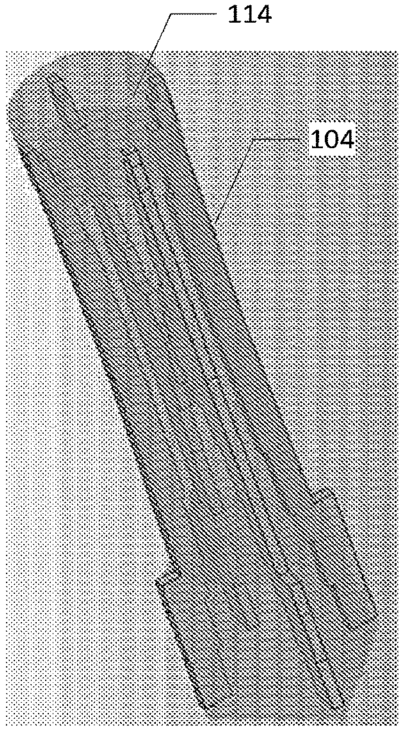
FIG. 2C illustrates a perspective view of polarizer 104 for unitary one-piece construction feed 100 illustrating a translucent outer wall according to various embodiments.
Figure 2A:
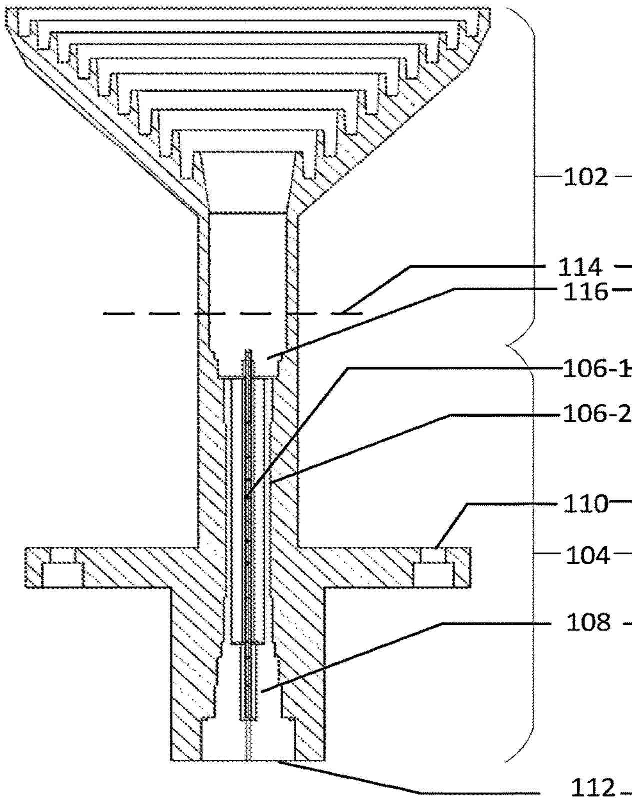
FIG. 2A illustrates a cross-sectional view of polarizer 104 for unitary one-piece construction feed 100 according to various embodiments.

FIG. 2A illustrates a cross-sectional view of polarizer 104 for unitary one-piece construction feed 100 according to various embodiments.

Figure 2B:
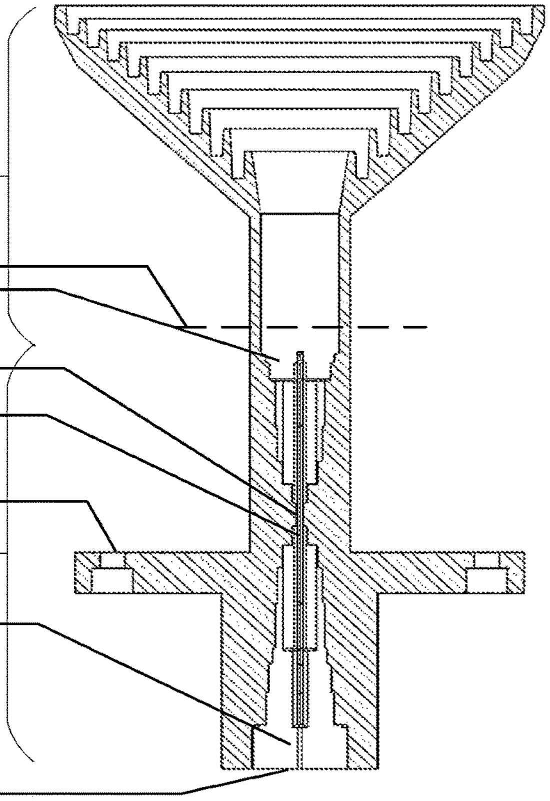
FIG. 2B illustrates a cross-sectional view of polarizer 104 for unitary one-piece construction feed 100 according to various embodiments.

FIG. 2B illustrates a cross-sectional view of polarizer 104 for unitary one-piece construction feed 100 according to various embodiments.

FIG. 2C illustrates a perspective view of polarizer 104 for unitary one-piece construction feed 100 illustrating a translucent outer wall according to various embodiments.

FIG. 3A illustrates a planar view from OMT port 112 of polarizer 104 for unitary one-piece construction feed 100 according to various embodiments.

FIG. 3B illustrates a perspective view from OMT port 112 of polarizer 104 for unitary one-piece construction feed 100 according to various embodiments.

A unitary one-piece construction feed 100 includes a feed horn 102 and a polarizer 104. Unitary one-piece construction feed 100 is designed to operate with a carrier signal ranging across one or two consecutive bands selected from Ku, K, Ka and Q bands, for example, from 17.3 GHz to 31 GHz. Unitary one-piece construction feed 100 may include a support 110 to support mounting of unitary one-piece construction feed 100 in an antenna (not shown).

Polarizer 104 may be a ridge polarizer. Polarizer 104 is unitary one-piece construction with and in direct contact with feed horn 102. Polarizer 104 converts linearly polarized waves into circularly polarized waves or vice versa. Feed horn 102 includes multiple sets of ridges 106 (ridge 106-1, ridge 106-2, ridge 106-3, ridge 106-4; see FIG. 3A; FIG. 3B) disposed in a polarizer void 108. Ridge 106-1 and ridge 106-2 may form a first set of ridges (unlabeled). Ridge 106-3 and ridge 106-4 may form a second set of ridges (unlabeled).

In some embodiments, feed horn 102 and polarizer 104 are integrally unibody formed, for example, by diecasting to form unitary one-piece construction feed 100, or by being a monolithic structure. Integrally unibody formed means the integrated feed 100 is formed as a single piece. The integral structure of the feed horn and the polarizer may be achieved through die-casting. This eliminates assembly and reduces the potential for leakage of air, water, and RF power. It also reduces variation in manufacturing and cuts the cost of the current feed-polarizer assembly.

To form unitary one-piece construction feed 100, a feed port 114 of polarizer 104 is disposed in direct contact with feed horn 102. Polarizer 104 and ridges 106 are responsible for the polarization of an incoming signal. There can be a gap 116 in the polarizer void 108 bound at least in part by an end of ridges 106 and feed port 114. An end of the polarizer void 108 acts as an OMT interface 112. OMT interface 112 is the part of unitary one-piece construction feed 100 where an OMT may be connected.

In FIG. 2A, FIG. 2B, FIG. 2C, FIG. 3A and FIG. 3B ridges 106 are shown with variations in maximum height. Ridges 106 may be stepped. Ridges 106 may include steps 122 at different heights. A height of a step may be measured between an inner surface 118 of polarizer void 108 and a center 120 of polarizer void 108 (see FIG. 3A, 3B). The height of the step closest to center 120 defines maximum heights 124 of each of the respective ridges 106 (maximum height 124-1, maximum height 124-2). Maximum heights 124 of ridges 106 may vary.

Ridge 106-1 and ridge 106-2 may define a first set of ridges (unmarked). Ridge 106-1 and ridge 106-2 of the first set of ridges may be disposed opposite one another. Ridge 106-1 and ridge 106-2 of the first set of ridges may have identical maximum heights, i.e., maximum height 124-1.

Ridge 106-3 and ridge 106-4 may define a second set of ridges (unmarked). Ridge 106-3 and ridge 106-4 of the second set of ridges may be disposed opposite one another. Ridge 106-3 and ridge 106-4 of the second set of ridges may have identical maximum heights, i.e., maximum height 124-2.

When polarizer void 108 is substantially octagonal, ridges 106 may be equally spaced on inner surface 118. For example, when two sets of two ridges are disposed in polarizer void 108, ridges 106 may be spaced about 90 degrees from one another along a length of substantially octagonal polarizer void 108. The first set of ridges may reduce a cutoff frequency of the polarizer and may provide a 90-degree relative phase shift.

In the present teachings, a usual transition divider of the prior art antenna feed is eliminated. In some embodiments, compatibility with existing an Ortho-Mode Transducer (OMT) is maintained. Power of the incoming signal may be equally disposed between the two horn polarizations. The vertical and horizontal polarization modes are placed aligned with the ridges, at +/−45 degrees—halfway between the two OMT polarizations.

FIG. 4A illustrates a return loss of a unitary one-piece construction feed in decibels for a signal ranging from about 17 GHz to 32 GHz.

FIG. 4A illustrates that the unitary one-piece construction feed of the present teachings incurs a return loss of about −20 dB or less for a signal ranging from about 17.3 GHz to 30.5 GHz for S(1(1),1(1)).

FIG. 4B illustrates a return loss of a unitary one-piece construction feed in decibels for a signal ranging from about 17 GHz to 32 GHz.

FIG. 4B illustrates that the unitary one-piece construction feed of the present teachings incurs a return loss of about-20 dB or less for a signal ranging from about 17.3 GHz to 30.5 GHz for S(1(2),1(1)).

FIG. 4C illustrates a cross-polar discrimination of a unitary one-piece construction feed in decibels for a signal ranging from about 17 GHz to 32 GHz.

FIG. 4C illustrates that the unitary one-piece construction feed of the present teachings incurs a cross-polar discrimination loss of about-20 dB or less for a signal ranging from about 17.3 GHz to 30.5 GHz for S(1(2),1(1)).

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

I claim as my invention:

1. A unitary one-piece construction feed for a band antenna, the feed comprising:

a feed horn; and a polarizer comprising a void and multiple sets of ridges disposed in the void, wherein the feed horn and the polarizer are integrally formed as a seamless monolithic diecast unibody formed in a single metal shot without an assembly interface therebetween, and the unitary one-piece construction feed is capable of operating with a carrier signal ranging across one or two consecutive bands selected from Ku, K, Ka and Q bands.

2. The unitary one-piece construction feed of claim 1, wherein the carrier signal ranges from 17.3 GHz to 31 GHz.

3. The unitary one-piece construction feed of claim 1, wherein the carrier signal comprises a transmission signal ranging from 17.3 GHz to 20.5 GHz, and a reception signal ranging from 28.5 GHz to 30.5 GHz.

4. The unitary one-piece construction feed of claim 1, wherein the carrier signal comprises a transmission signal in a K band, and a reception signal in a Ka band.

5. The unitary one-piece construction feed of claim 4, wherein each ridge of the multiple sets of ridges comprises steps.

6. The unitary one-piece construction feed of claim 1, wherein each set of ridges of the multiple sets of ridges comprises two ridges.

7. The unitary one-piece construction feed of claim 1, wherein each ridge of the multiple sets of ridges comprises steps.

8. The unitary one-piece construction feed of claim 1, further comprising a gap in the void between the feed horn and ends of the multiple sets of ridges.

9. The unitary one-piece construction feed of claim 1, wherein the void comprises an Ortho-Mode Transducer (OMT) interface.

10. The unitary one-piece construction feed of claim 1, wherein the unitary one-piece construction feed is used for satellite communications.

11. A unitary one-piece construction feed for a high frequency antenna, the feed comprising:

a feed horn; and a polarizer comprising a void and two sets of ridges disposed in the void, wherein a maximum height of one of the two sets of ridges is lower than a maximum height of other of the two sets of ridges, the feed horn and the polarizer are integrally formed as a seamless monolithic diecast unibody formed in a single metal shot without an assembly interface therebetween, and the unitary one-piece construction feed is capable of operating with a carrier signal ranging from 17.3 GHz to 31 GHz.

12. The unitary one-piece construction feed of claim 11, wherein the carrier signal comprises a transmission signal ranging from 17.3 GHz to 20.5 GHz, and a reception signal ranging from 28.5 GHz to 30.5 GHz.

13. The unitary one-piece construction feed of claim 11, wherein the carrier signal comprises a transmission signal in a K band, and a reception signal in a Ka band.

14. The unitary one-piece construction feed of claim 11, wherein each ridge of the two sets of ridges comprises steps.

15. The unitary one-piece construction feed of claim 11, further comprising a gap in the void between the feed horn and ends of the two sets of ridges.

16. The unitary one-piece construction feed of claim 11, wherein the void comprises an Ortho-Mode Transducer (OMT) interface.

* * * * *